Oct. 5, 1965  W. HOLZER  3,210,633
DRIVE MOTOR FOR A PROGRAM CONTROL APPARATUS
Filed April 12, 1960  2 Sheets-Sheet 2
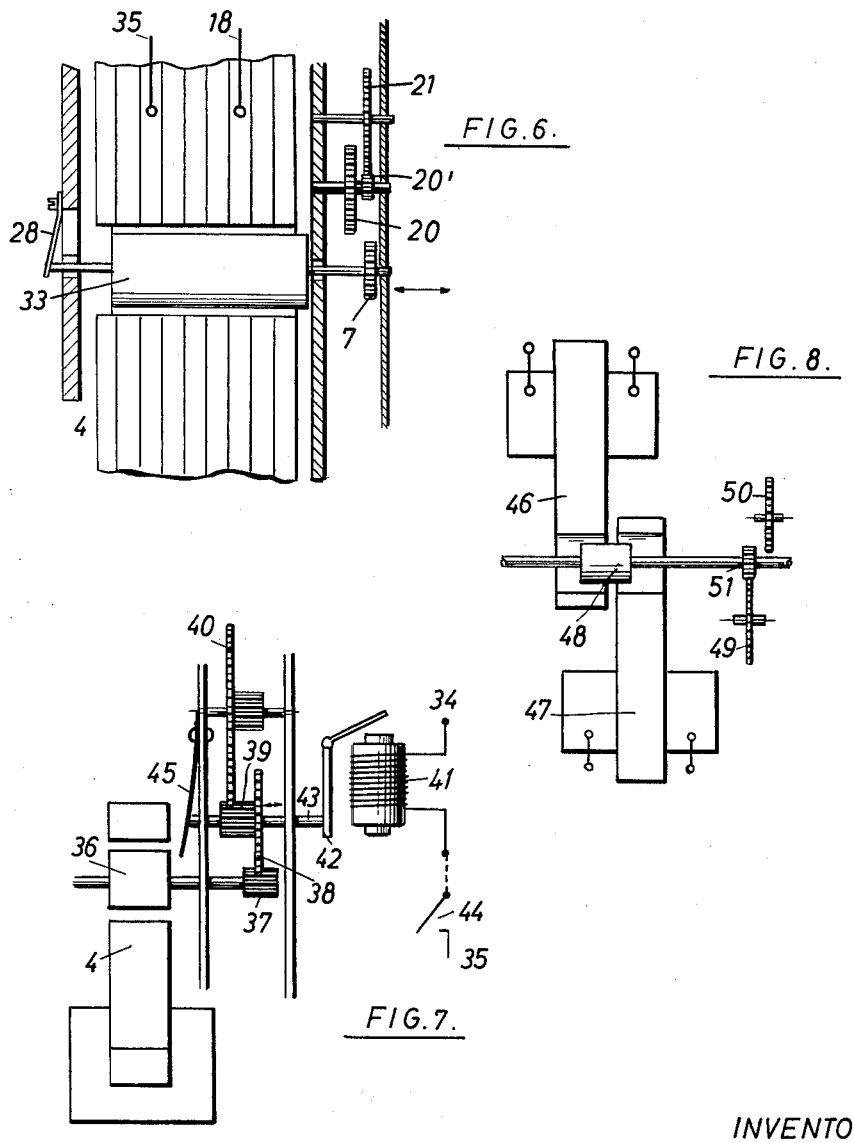
INVENTOR:
WALTER HOLZER
By Toulmin & Toulmin
Attorneys United States Patent Office
3,210,633
Patented Oct. 5, 1965

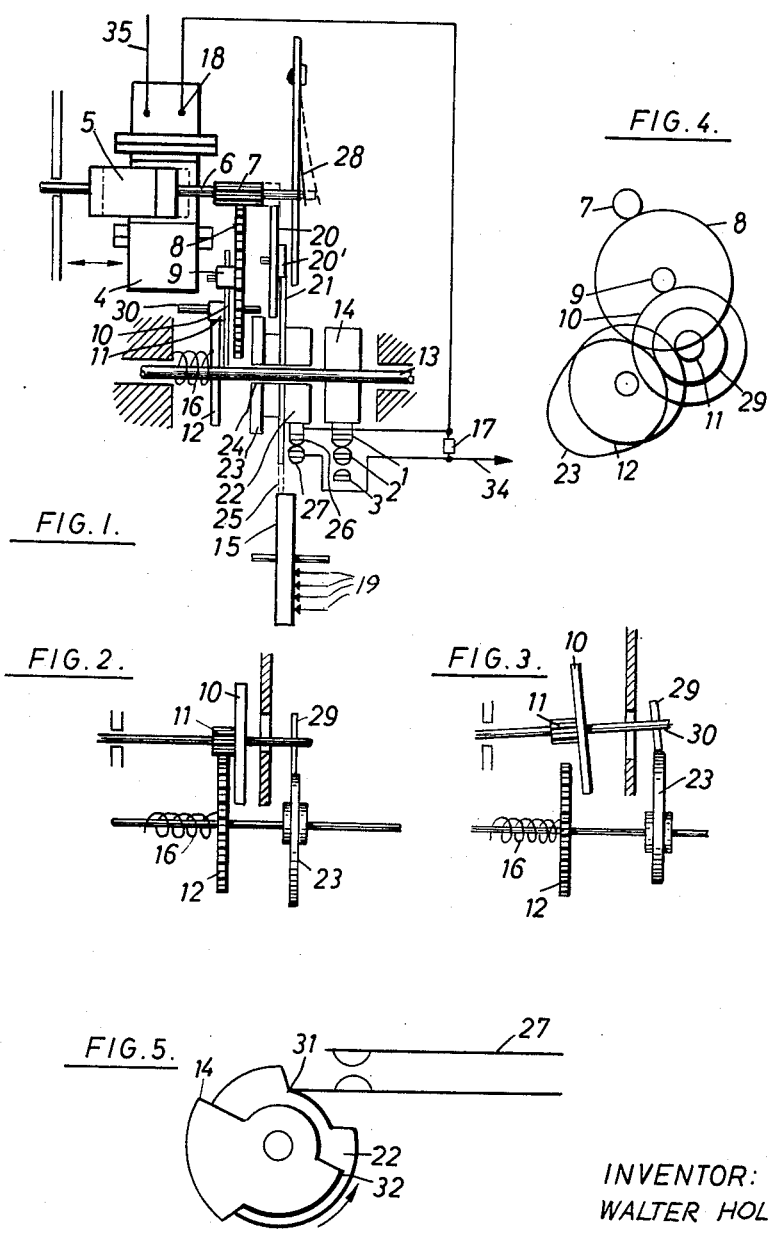

3,210,633
DRIVE MOTOR FOR A PROGRAM
CONTROL APPARATUS
Walter Holzer, Schutzenrain, Meersburg (Bodensee),
Germany
Filed Apr. 12, 1960, Ser. No. 21,804
The portion of the term of the patent subsequent to
June 25, 1979, has been disclaimed
Claims priority, application Germany, June 1, 1959,
H 36,522; June 15, 1959, H 36,665; July 25, 1959,
H 37,020; Oct. 24, 1959, H 37,772
1 Claim. (Cl. 318—466)

The present invention relates to a driving apparatus for a program control device having a timed pulse device and a step switching device.

In the usual arrangement the pulse device furnishing timed pulses for the stepping of a program switch, and the driving means for the program contacts each have a separate motor. The separate motors were a necessity since the pulse device must function at precise intervals, thus requiring a motor with highly constant speed, while the stepping of the program contacts in intermittent service requires an asynchronous motor, i.e. a motor with a high torque. This motor, as a rule, does not have the constant speed necessary for synchronous operation.

Further disadvantages of using two motors include the increased probability of breakdown, the need for more space, and the increased production costs. The object of this invention is to avoid these disadvantages and to employ a single motor for the function usually carried out by two. Nevertheless, the same advantages must be retained in respect to versatility and further requirements for the precise functioning of the impulse device and the stepping device for the program contacts.

The object of this invention is to avoid the disadvantages of the known devices, and to use but one motor for driving both, a timer and a step switching device.

It is a primary feature of the present invention to employ two different gears linkable with a pinion driven by a single motor; the gears in turn are drivingly connected to a pulse device and a step switching device, respectively, and there is an electromagnetic device for disengaging selectively that gear from the pinion which is connected to the step switching device, after one step, while re-engagement is caused in dependence upon the pulse device.

Another feature of the invention is a cam disc rotating together with the program control and temporarily interrupting a link or driving connection or coupling within the gear transmission driving the pulse control so that the latter can return to zero or initial position. Another feature of the invention is a spring biased gear or clutch governing the link between rotor and program control; the spring bias is overcome by an electric control shifting the rotor into driving engagement with the program control, while the electric control is disabled by the program control itself after one step, and then the spring shifts the rotor back whereby the latter is disengaged from the program control.

In accordance with this kind of design, a motor with a specially built coupling is used to ensure that both the pulse device and the stepping device for the program contacts return independent of one another to their initial positions after the conclusion of a pulse or a step.

A motor which is specially suited for the simultaneous drive of the impulse device and the stepping of the program contacts has a shiftable armature slidably in axial direction, so that the sliding armature through poles functions as a synchronous motor in one axial position and as an asynchronous motor in a second position axially displaced from the first mentioned position.

This arrangement can be considered the ideal solution, since on the one hand it ensures absolute precision of the pulse transmission, and on the other hand it provides the greatest amount of torque for the stepping of the program contacts. In accordance with this construction, the drive can be shifted from impulse device to program contacts in merely using control currents. There may be provided manually operated contacts, operating together with the program contacts, since when the predetermined position is reached, it is by-passed because the automatic cut-out contacts of the drive motor are bridged.

This arrangement permits the arbitrary exclusion or by-passing of whole program sections in order to change the program. We are dealing here with rapid pre-selection.

Another possibility is to have the rotor axially slidable so as to cooperate with either one of two axially aligned stator yokes.

A still further possibility resides in the provision of having the rotor retain its axial position with respect to a stator, while the step switching device controls the current to an electromagnet which in turn shifts the gear for the step switching device in and out of engagement with a pinion on the rotor shaft.

While the specification concludes with claims particularly pointing out and distinctly claiming the subject matter which is regarded as the invention, it is believed that the invention, the objects of the invention, and further objects and advantages thereof, will be better understood from the following description taken in connection with the accompanying drawing in which:

FIG. 1 shows schematically the application of one motor to drive a pulse device as well as a stepping device, using a motor which functions alternately as a synchronous or asynchronous motor;

FIG. 2 shows one position of a coupling shown in FIG. 1 in action;

FIG. 3 shows the disengaged position of the coupling in FIG. 1 in action;

FIG. 4 shows a side view of the wheels in FIG. 2;

FIG. 5 shows one possible arrangement of a contact system of a pulse device including an automatic cut-out or self-interruption mechanism;

FIG. 6 shows another possible design of the coupling between a rotor and pulse and step switching device;

FIG. 7 shows an electromagnetic clutch; and

FIG. 8 shows a sliding rotor in a divided magnetic yoke.

FIG. 1 shows one possible construction in an arrangement in which a single motor operates a pulse device as well as the stepping of program contacts over a coupling. In FIG. 1 a pulse contact system, consisting of contacts 1, 2 and 3 is driven by a motor 4 having an axially displaceable rotor 5 with shaft 6. Contacts 1, 2 and 3 are operated upon by the following intermediate elements: Armature rotor 5 has a pinion 7 on its shaft 6, which together with its gear wheel 8 and a pinion 9 drives an intermediate wheel 10 having pinion 11 which in turn drives a gear wheel 12. Gear wheel 12 is secured to shaft 13 carrying a cam disc in which directly operates contacts 1, 2 and 3. Contacts 1, 2 and 3 are closed in sequence when cam disc 14 is turned. The closing of these contacts in sequence may also be used to start a stepping of switching disc 15, which, in turn, operates program contacts 19, as well as the other contacts not shown. This will be described below.

In accordance with the principles of the invention, the cam disc 14 is driven via a coupling formed by the intermediate wheel 10 and its pinion 11. This pinion 11 can be disengaged from gear wheel 12. When pinion 11 is disengaged, spring 16 recoils by rotation gear wheel 12, shaft 13 and cam disc 14 back into their initial or zero position.

The stepping of switching disc 15 is produced by motor 4 by means of other intermediate elements, but disc 15 is not always coupled drivingly to member 4. Power transmission is achieved in the following manner and by means of the following elements. There is provided an electrical resistor 17 connected in series in the lead-in wire to motor winding 18. Resistor 17 can be overbridged by contacts 26–27. Armature or rotor 5 moves into the position indicated by the dotted lines under the influence of the increased magnetization. Increased magnetization occurs when resistor 17 is short-circuited. When rotor 5 is in the "dotted" position pinion 7 is engaged with gear wheel 20 having a pinion 20′. Pinion 20′ meshes with a drive wheel 21. Drive wheel 21 is integral with or secured to cam discs 22 and 23. Cam disc 22 is depicted in FIG. 5 disc 23 is eccentric as shown in FIG. 4. Eccentric disc 23 and disc 27 is keyed onto hollow shaft 24 receiving shaft 13. Drive wheel 21 drives switching disc 15 for program contacts 19, eventually over intermediate elements 25.

Cam disc 22 operates contacts 26 and 27 bridging resistor 17 during any one step, until cam disc 22 has returned to its initial position and opened contacts 26 and 27 by means of recess 31. In that way resistor 17 is placed again in series circuit connection of motor 4. In this instance armature or rotor 5 is forced back into its initial position by spring 28.

During one revolution of cam disc 22, corresponding to one step of switching disc 15, the eccentric disc 23 temporarily disengages intermediate wheel 10 and pinion 11 from gear wheel 12. This operation will be comprehended in connection with FIGS. 2 and 3. In FIG. 2 pinion 11 is engaged with gear wheel 12 and pulse contacts 1, 2 and 3 are then driven by cam disc 14.

In FIG. 3 eccentric disc 23 is in a position occurring during the stepping (rotation of elements 22, 23 and 24) that an intermediate wheel 29 (omitted in FIG. 1) together with shaft 30 carrying intermediate wheel 10 and pinion gear 11, are raised. In this position pinion 11 and gear wheel 12 are disengaged and spring 16 recoils gear wheel 12, shaft 13 and cam disc 14 by rotation, into their initial position, which is the initial position of the timer or pulse device.

FIG. 4 shows the gearing in FIGS. 2 and 3 from a side view. It is particularly important that the axial shift needed to engage pinion 7 and gear wheel 20 is used to change the running characteristics of motor 4. When rotor 5 is in the position shown in the drawing, it functions, in the presence of poles, as a synchronous motor which, with a small load, operates with the greatest precision. In the position indicated by the dotted lines, corresponding to an increased magnetization current, the motor functions as an asynchronous motor and is capable of producing a relatively high amount of torque. This is necessary in order to operate switching disc 15 and a number of program contacts 19.

In other words, when rotor 5 is in the position indicated, it is only partially exposed to the magnetic yoke, and then only from the influence of the magnetic field. It only needs a small torque when driving the pulse device, i.e. in this position it has a good synchronism, and enables the pulse device or the corresponding cam discs with contacts to turn exactly.

When engaged, that is, in the position shown, it provides more torque due to the strong magnetization, and is now suitable for operating the stepping of the program contacts as a motor connected to an automatic cut-out. The motor comes in the position shown by the dotted lines through an increased magnetization current, which must be great enough that armature shifts counter to the force of a readjusting spring. The spring will be described later.

This arrangement described thus far, operates in the following way. First motor 4 runs as a synchronous motor and drives cam disc 14 out of its initial position so that contacts 1, 2 and 3 be closed after predetermined times. This is the timer action of the pulse device. The contacts may also effect an increase of the magnetization current over a pre-selector not appearing in the drawings, overbridging resistor 17. The increased magnetization current pulls rotor 5 into the position indicated by the dotted lines. Now pinion 7 engages wheel 20 and switching disc 15 is rotated with a high amount of torque; cam discs 22 and 23 follow this rotation. Cam disc 22 operates contacts 26 and 27 as stated. These contacts 26 and 27 maintain the increased magnetization current by continuing the bridging of resistor 17 until cam disc 22 has revolved completely. Thus, resistor 17 remains out of circuit even if contacts 1–3 are opened by the recoiling of cam disc 14 described above. Cam disc 22 insures that a complete revolution of elements 22 and 23 is carried out before contacts 26 and 27 are opened so that a complete step of switching disc 15 takes place with motor 4 running as a synchronous motor. When recess 31 opens contacts 26 and 27, rotor 5 returns to its initial position due to the decreased magnetization current. Pinion 7 then again is disengaged from gear wheel 20, and the movement of the switching disc 15 and of cam discs 22 and 23 ends.

FIG. 5 furthermore shows a simplified design of the arrangement depicted in FIG. 1, whereby both cam disc 14 and cam disc 22 operate the same contacts 26 and 27. The arrangement operates in the following manner: after a given period of time, shoulder 32 of cam disc 14 reaches contact 26 and bends it so as to connect with contact 27. In that way only contacts 26 and 27 serve to shunt resistor 17 so that the magnetization current of motor 4 is increased. Thereafter cam disc 22 commences to run thereby holding contacts 26 and 27 in a closed position for a complete revolution of disc 22.

During the revolution of cam disc 22, corresponding to a step of switching disc 15, the coupling, consisting of intermediate wheel and pinion 11 is disengaged and cam disc 14 is recoiled back into its starting or zero position as outlined above. Independent of that, cam disc 22 affixed to hollow shaft 24 completes its revolution until contacts 26 and 27 pass through recess 31 and open with the effect outlined above. One reservation must be made for this arrangement, namely that only one impulse time can be controlled.

One can also see clearly how pinion 7 is coupled to gear wheel 20 when the armature or rotor shifts. A change in the magnetization current shifts the armature, whereby, for instance, the winding of motor 4 is directly placed between potentials 34 and 35, and pre-resistor 17 is shifted into this circuit to decrease the magnetization current. Certainly, other arrangements for changing the magnetization current are conceivable, i.e. a number of windings or connections on a multiple winding.

FIG. 7 depicts another design of such a driving mechanism. In this design the armature is not shifted, but an armature 36, incapable of axial movement, has a pinion 37 and engages gear wheel 38 therewith. Gear wheel 38 drives gear wheel 40 (corresponding to wheel 20 of FIG. 1) and other parts of the gear with its pinion 39. In this case the coupling is presented as a magnetic clutch. An electromagnet 41 has an armature which operates a lever 42 and thereby shifts shaft 43 with gear wheel 38 and pinion 35. Magnet 41 is also connected to lines 34 and 35 via a control switch 44.

The advantage of this arrangement lies in the fact that only smaller masses have to be shifted, so that a rapid stop can be made, since no moments of inertia have to be retarded. When the voltage from potential 34 and 35 is taken away from magnet 41 by opening switch 44, shaft 43 and gear wheel 38 return to the engaged position, as illustrated, under the pressure of a spring 45. This arrangement works in such a way that gear wheel 38 and pinion 37 are engaged when the magnet is without current. Gear wheel 38 is disengaged from pinion 37 when current flows through magnet 41. The action of contact 44 indicated, corresponds to the action of the contacts 26 and 27 in FIG. 1 which increase or decrease the magnetization current. Pinion 37, of course, retains engagement with wheel 8 (FIG. 1), not shown here.

FIG. 8 depicts another design of a sliding rotor. This arrangement operates with a magnetic yoke divided into two parts, consisting of yoke 46, and yoke 47. Rotor 48 is drawn into engagement with gear wheel 49 or 50 depending upon which yoke, 46 or 47, is activated. Alternative activation of yokes or stator 46 and 47 is, of course, controlled by contacts such as 26, 27, 1, 2, 3 (FIG. 1). Pinion 51 drives, accordingly, the timed pulse device or the stepping device for the program contacts. The advantage of this arrangement is not only that full magnetization power is exploited in both positions, but also that a greater independence from shock persists, since the action does not take place counter to any spring force. The strong magnetic catch makes the mechanism shock proof in both positions.

The invention can be used in all cases where one desires to construct a motor and its coupling in such a way that in one position of the coupling, with a very small load, transmission takes place, suitable for a time switch, and in the other position, with huge loads, transmission suitable for the stepping of the contacts.

The invention can also be used in all cases where two driving means are available for a control, where greatest degree of precision is demanded from one driving mechanism, and a high amount of torque required of the other.

What is claimed is:

Driving apparatus for a program and timed pulse control device comprising: an electric motor having a first stator, a rotor having a first armature and a shaft; a pinion on said shaft; a rotatable pulse device including a cam disc; stationary contacts actuated by said cam disc; a rotating step switching device; a first gearing means coupling said pinion to said pulse device for rotation therewith; a second gearing means including an axially displaceable gear wheel capable of engaging and disengaging said pinion, so as to rotatably connect said pinion to said step switching device; and an electromagnet having a second stator and a second armature, said second armature engaging said axially displaceable gear wheel for displacement thereof, said second stator connected to said first stator and to said contacts controlling the simultaneous energizing of said electric motor and said electromagnet.

References Cited by the Examiner

UNITED STATES PATENTS

| | | | |
|---|---|---|---|
| 2,190,447 | 2/40 | Frazier | 192—.02 |
| 2,195,652 | 4/40 | Hutchins et al. | 310—78 |
| 2,271,207 | 1/42 | Rhein | 310—209 X |
| 3,041,480 | 6/62 | Holzer | 307—141 |
| 3,164,729 | 1/65 | Holzer | 318—540 X |

ORIS L. RADER, *Primary Examiner.*

MILTON O. HIRSHFIELD, *Examiner.*